US012022076B2

United States Patent
Jang (10) Patent No.: US 12,022,076 B2
(45) Date of Patent: *Jun. 25, 2024

(54) METHOD OF REMOVING DEBLOCKING ARTIFACTS

(71) Applicant: GENSQUARE LLC, Seoul (KR)

(72) Inventor: Min Jang, Seoul (KR)

(73) Assignee: GENSQUARE LLC, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/220,595

(22) Filed: Jul. 11, 2023

(65) Prior Publication Data

US 2023/0353738 A1 Nov. 2, 2023

Related U.S. Application Data

(63) Continuation of application No. 17/387,560, filed on Jul. 28, 2021, now Pat. No. 11,729,388, which is a (Continued)

(30) Foreign Application Priority Data

Jan. 9, 2012 (KR) .................. 10-2012-0002597

(51) Int. Cl.
*H04N 19/137* (2014.01)
*G06T 5/00* (2006.01)
(Continued)

(52) U.S. Cl.
CPC ............ *H04N 19/124* (2014.11); *G06T 5/00* (2013.01); *H04N 1/409* (2013.01); (Continued)

(58) Field of Classification Search
CPC combination set(s) only.
See application file for complete search history.

(56) References Cited

U.S. PATENT DOCUMENTS

2003/0044080 A1   3/2003   Frishman et al.
2004/0042548 A1   3/2004   Yu et al.
(Continued)

FOREIGN PATENT DOCUMENTS

CN       1870752 A       11/2006
CN       101304526 A     11/2008
WO   WO 2011/124254 A1  10/2011

OTHER PUBLICATIONS

Park et al., "Non-CE12: BS Decision Tree Simplification," Joint Collaborative Team on Video Coding (JCT-VC) of ITU-T SG16 WP3 and ISO/IEC JTC1/SC29/WG11, 7th Meeting, Document: JCTVC-G175, Geneva, CH, Nov. 21-30, 2011, pp. 1-12.
(Continued)

*Primary Examiner* — Md N Haque
(74) *Attorney, Agent, or Firm* — Birch, Stewart, Kolasch & Birch, LLP (57) ABSTRACT

A method of processing a reconstructed picture can include generating a prediction block based on a prediction mode; generating a quantization block by inverse-scanning quantization coefficient information; generating a transform block by inverse-quantizing the quantization block using a quantization parameter; generating a residual block by inverse-transforming the transform block; generating a reconstructed picture by using the prediction block and the residual block; and applying a deblocking filter on the reconstructed picture. Also, it is determined whether the deblocking filtering is applied between two adjacent blocks P and Q containing samples p0 and q0 respectively by using a boundary quantization parameter when a boundary strength is not zero, and the boundary quantization parameter is set to an average value of a quantization parameter of block P and a quantization parameter of block Q, and the quantization parameter is derived by adding a residual
(Continued)

(First Step)

(Second Step)

quantization parameter and a quantization parameter predictor.

3 Claims, 9 Drawing Sheets

Related U.S. Application Data continuation of application No. 16/685,721, filed on Nov. 15, 2019, now Pat. No. 11,100,609, which is a continuation of application No. 14/349,557, filed as application No. PCT/CN2013/070217 on Jan. 8, 2013, now Pat. No. 10,504,208.

(51) Int. Cl.
| | | |
|---|---|---|
| *H04N 1/409* | (2006.01) | |
| *H04N 19/107* | (2014.01) | |
| *H04N 19/117* | (2014.01) | |
| *H04N 19/124* | (2014.01) | |
| *H04N 19/14* | (2014.01) | |
| *H04N 19/159* | (2014.01) | |
| *H04N 19/174* | (2014.01) | |
| *H04N 19/176* | (2014.01) | |
| *H04N 19/194* | (2014.01) | |
| *H04N 19/46* | (2014.01) | |
| *H04N 19/82* | (2014.01) | |
| *H04N 19/86* | (2014.01) | |

(52) U.S. Cl.
CPC ......... *H04N 19/107* (2014.11); *H04N 19/117* (2014.11); *H04N 19/137* (2014.11); *H04N 19/14* (2014.11); *H04N 19/159* (2014.11); *H04N 19/174* (2014.11); *H04N 19/176* (2014.11); *H04N 19/194* (2014.11); *H04N 19/46* (2014.11); *H04N 19/82* (2014.11); *H04N 19/86* (2014.11)

(56) References Cited

U.S. PATENT DOCUMENTS

| | | |
|---|---|---|
| 2006/0078052 A1 | 4/2006 | Dang |
| 2007/0071095 A1 | 3/2007 | Lim |
| 2007/0092002 A1* | 4/2007 | Xue .................... H04N 19/112 375/240.03 |
| 2007/0230564 A1 | 10/2007 | Chen et al. |
| 2009/0097575 A1 | 4/2009 | Teng et al. |
| 2009/0180700 A1 | 7/2009 | Kim et al. |
| 2009/0296808 A1* | 12/2009 | Regunathan ......... H04N 19/124 375/240.03 |
| 2011/0206135 A1* | 8/2011 | Drugeon .............. H04N 19/129 375/240.24 |
| 2012/0189051 A1* | 7/2012 | Zheng ................... H04N 19/86 375/240.12 |
| 2013/0266061 A1 | 10/2013 | An et al. |
| 2014/0369428 A1 | 12/2014 | Park et al. |
| 2018/0035111 A1* | 2/2018 | Oh ....................... H04N 19/124 |

OTHER PUBLICATIONS

Extended European search report for EP Application No. 13 73 5902.2 dated Apr. 16, 2015.
Gao et al., "Hao.Optimization of deblocking filter for H.264/AVC based on pre-judging BS.," Computer Engineering and Applications, vol. 43, No. 34, Dec. 31, 2007, pp. 38-40 (4 pages total).
Geert Van Der Auwera et al., "Support of varying QP in deblocking", JCTVC-G1031, Nov. 27, 2011, pp. 1-5.
International Search Report for PCT/CN2013/070217 filed on Jan. 8, 2013.
Seungwook Park et al., "BS decision tree simplification", JCTVC-GXXX, Nov. 7, 2011, pp. 1-4.
Seungwook Park et al., "Non-CE12: Simplified BS calculation process in deblocking filter", JCTVC-G176, Nov. 22, 2011, pp. 1-11.
Yi, "Chinese Doctoral Dissertations & Master's Theses Full-text Database (Master)," Information Science and Technology, ISSN 1674-0246, May 15, 2006, pp. 50-58 (12 pages total).

* cited by examiner

(First Step)

METHOD OF REMOVING DEBLOCKING ARTIFACTS

CROSS-REFERENCE TO RELATED APPLICATIONS

This application is Continuation Application of U.S. patent application Ser. No. 17/387,560, filed on Jul. 28, 2021, which is a Continuation Application of U.S. patent application Ser. No. 16/685,721, filed on Nov. 15, 2019 (now U.S. Pat. No. 11,100,609 issued on Aug. 24, 2021), which is a Continuation Application of U.S. patent application Ser. No. 14/349,557, filed on Apr. 3, 2014 (now U.S. Pat. No. 10,504,208 issued on Dec. 10, 2019), which is the National Phase under 35 U.S.C. § 371 of International Application No. PCT/CN2013/070217, filed on Jan. 8, 2013, which claims the benefit under 35 U.S.C. § 119(a) to Korean Patent Application No. 10-2012-0002597, filed in the Republic of Korea on Jan. 9, 2012, all of these applications are hereby expressly incorporated by reference into the present application.

BACKGROUND

Field of the Invention

The present invention relates to a deblocking filtering method for removing blocking artifacts in reconstructed image, and more particularly, to a method of determining boundary strength on each edge of a transform boundary and a prediction boundary.

Related Art

For compression of video data, a plurality of video standards has been developed. Such video standards are, for example, MPEG-2, MPEG-4 and H.264/MPEG-4 AVC. As a successor to H.264/MPEG-4 AVC, High Efficiency Video Coding (HEVC) is currently under joint development by the ISO/IEC Moving Picture Experts Group (MPEG) and ITU-T Video Coding Expert Group (VCEG).

According to HEVC, one picture is divided into largest coding units (LCUs), one or more coding units of each LCU are encoded by generating a prediction block using inter prediction or intra prediction. The difference between an original block and the prediction block is transformed to generate a transformed block, and the transformed block is quantized using a quantization parameter and one of a plurality of predetermined quantization matrices. The quantized coefficients of the quantized block are scanned by a predetermined scan type and then entropy-coded. The quantized coefficients are inversely quantized and inversely transformed to generate a residual block which is combined with the prediction block to generate reconstructed image. The reconstructed image is adaptively filtered using a deblocking filter to remove blocking artifacts.

Figure 1:
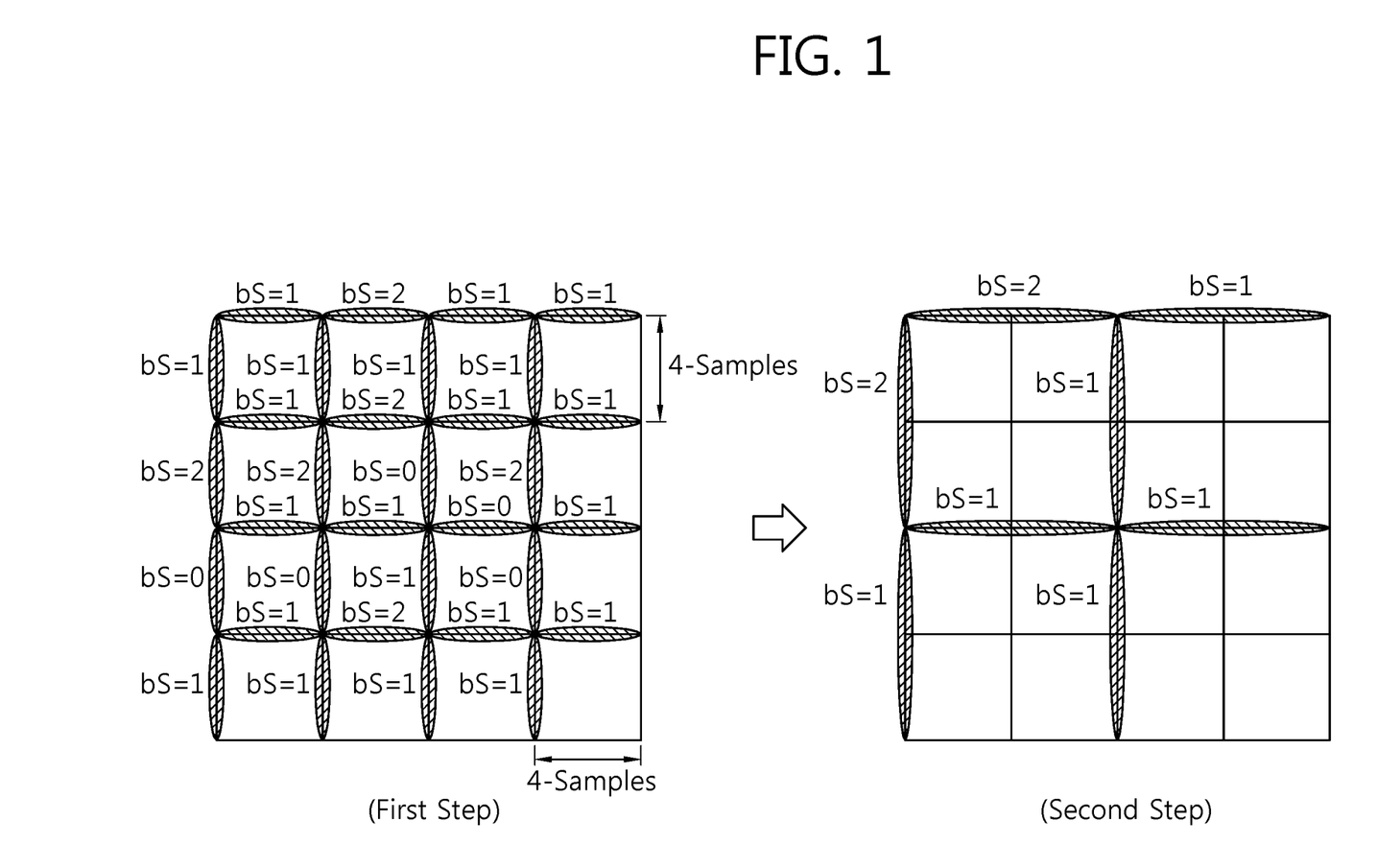
FIG. 1 is a conceptual diagram illustrating a procedure of determining the boundary strength according to HEVC under development.

FIG. 1 is a conceptual diagram illustrating a procedure of determining the boundary strength according to HEVC under development.

As shown in FIG. 1, boundary strength is determined on every edge of all 4×4 blocks in the first step, and then the final boundary strength is determined on edges of 8×8 blocks. The edge of the 8×8 block is comprised of two consecutive edges of 4×4 blocks. The boundary strength of the edge of the 8×8 block is determined as a maximum of boundary strength of two edges that constitute the edge of the 8×8 block. But, the technique of deblocking filter described in HEVC under development deteriorates encoding and decoding performance because the technique is too complicated.

Therefore, the standardization of HEVC under development focuses on the technique reducing the complexity of the deblocking filter as well as improving the performance of the deblocking filter. In particular, new techniques able to reduce operational complexity and memory capacity required to perform the deblocking filtering are required because HEVC focuses on encoding and decoding ultra high-definition image.

SUMMARY OF THE INVENTION

The present invention is directed to a deblocking filtering method of reducing the data quantity to be stored in memory and reducing operation complexity with removing blocking artifacts effectively.

One aspect of the present invention provides a method of removing blocking artifacts, comprising: determining a boundary strength for each 4-sample edge lying on 8×8 sample grid, determining whether deblocking filtering is performed on the 4-sample edge or not if the boundary strength is not equal to zero, selecting a deblocking filter if the deblocking filtering is performed on the 4-sample edge, and filtering the 4-sample edge using the selected filter.

A method according to the present invention determines a boundary strength for each 4-sample edge lying on 8×8 sample grid, determines whether deblocking filtering is performed on the 4-sample edge or not if the boundary strength is not equal to zero, selects a deblocking filter if the deblocking filtering is performed on the 4-sample edge, and filters the 4-sample edge using the selected filter. Accordingly, the computational complexity required to determine the boundary strength according to the present invention is reduced by 50% or more when compared with the HEVC under development. Also, the memory capacity and bandwidth required to determine the boundary strength are reduced by 50% or more without deterioration of image quality.

DETAILED DESCRIPTION OF THE EMBODIMENTS

Hereinafter, various embodiments of the present invention will be described in detail with reference to the accompanying drawings. However, the present invention is not limited to the exemplary embodiments disclosed below, but can be implemented in various types. Therefore, many other modifications and variations of the present invention are possible, and it is to be understood that within the scope of the disclosed concept, the present invention may be practiced otherwise than as has been specifically described.

A moving picture encoding apparatus and an moving picture decoding apparatus according to the present invention may be a user terminal such as a personal computer, a personal mobile terminal, a mobile multimedia player, a smartphone or a wireless communication terminal. The image encoding device and the image decoding device may be include a communication unit for communicating with various devices, a memory for storing various programs and data used to encode or decode images.

Figure 2:
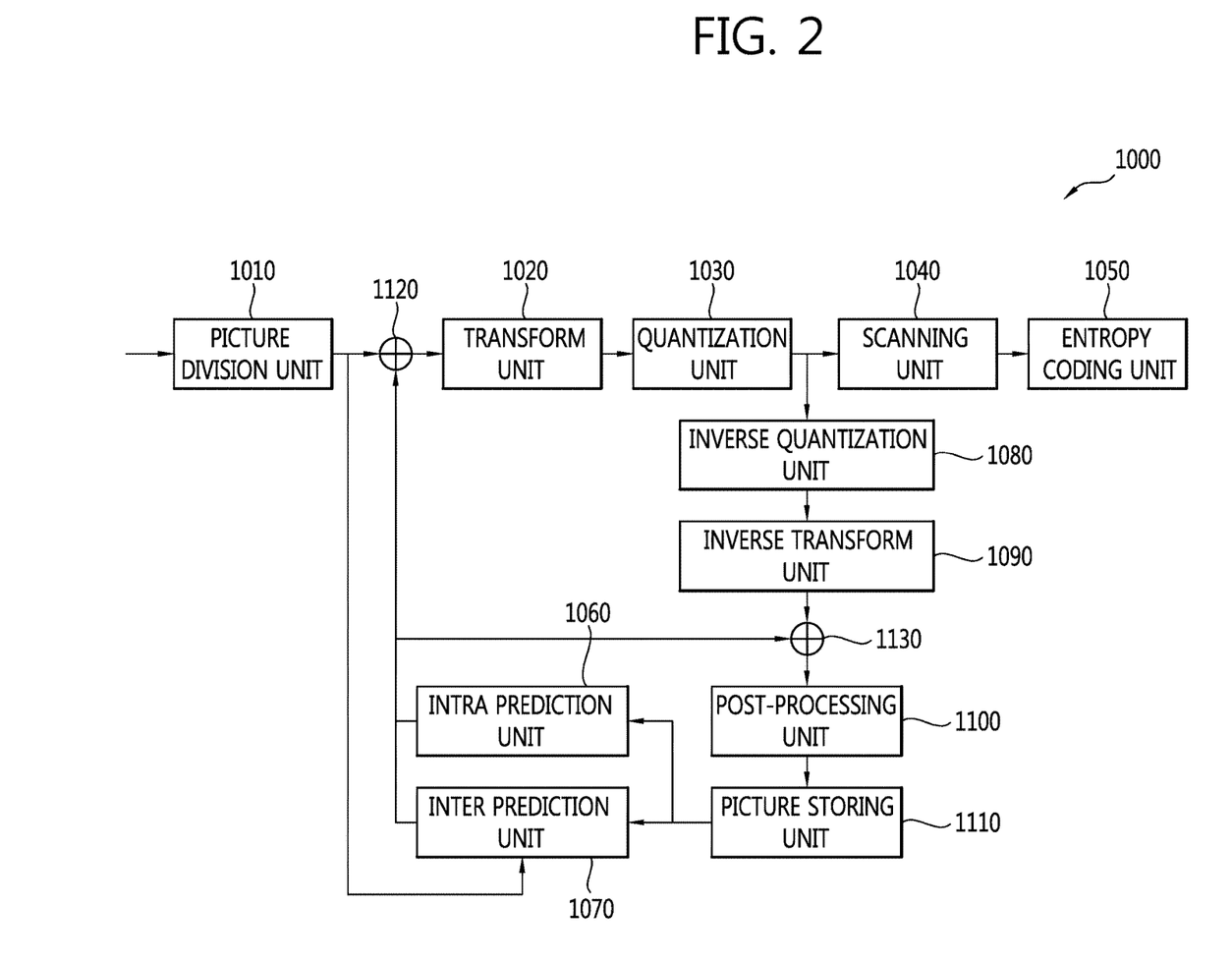
FIG. 2 is a block diagram illustrating a moving picture encoding apparatus according to the present invention.

FIG. 2 is a block diagram illustrating a moving picture encoding apparatus 1000 according to the present invention.

Referring to FIG. 2, the moving picture encoding apparatus 1000 includes a picture division unit 1010, a transform unit 1020, a quantization unit 1030, a scanning unit 1040, an entropy coding unit 1050, an intra prediction unit 1060, an inter prediction unit 1070, an inverse quantization unit 1080, an inverse transform unit 1090, a post-processing unit 1100, a picture storing unit 1110, a subtraction unit 1120 and an addition unit 1130.

The picture division unit 1010 divides a picture or a slice into plural largest coding units (LCUs), and divides each LCU into one or more coding units. The size of LCU may be 32×32, 64×64 or 128x128. The picture division unit 1010 determines prediction mode and partitioning mode of each coding unit.

An LCU includes one or more coding units. The LCU has a recursive quad tree structure to specify a division structure of the LCU. Parameters for specifying the maximum size and the minimum size of the coding unit are included in a sequence parameter set. The division structure is specified by one or more split coding unit flags. The size of a coding unit is 2N×2N. If the size of the LCU is 64×64 and the size of a smallest coding unit (SCU) is 8x8, the size of the coding unit may be 64×64, 32×32, 16×16 or 8×8.

A coding unit includes one or more prediction units. In intra prediction, the size of the prediction unit is 2N×2N or N×N. In inter prediction, the size of the prediction unit is specified by the partitioning mode. The partitioning mode is one of 2N×2N, 2N×N, N×2N and N×N if the coding unit is partitioned symmetrically. The partitioning mode is one of 2N×nU, 2N×nD, nL×2N and nR×2N if the coding unit is partitioned asymmetrically.

A coding unit includes one or more transform units. The transform unit has a recursive quad tree structure to specify a division structure of the coding unit. The division structure is specified by one or more split transform unit flags. Parameters for specifying the maximum size and the minimum size of the transform unit are included in a sequence parameter set.

The transform unit 1020 transforms residual signals to generate a transformed block. The residual signals are transformed in a transform unit basis. The residual signals are derived by subtracting a prediction block which is generated by the intra prediction unit 1060 or the inter prediction unit 1070 from an original block.

Different transform matrix may be used according to the prediction mode (intra prediction mode or inter prediction mode). Also, in intra prediction mode, the transform matrix may be adaptively determined based on an intra prediction mode. The transform unit is transformed using two 1-dimensional transform matrixes (horizontal matrix and vertical matrix). For example, in horizontal intra prediction mode of intra prediction, a DCT-based integer matrix is applied to vertical direction and a DST-based or KLT-based integer matrix is applied to horizontal direction because the residual signals may have vertical directionality. In vertical intra prediction mode of intra prediction, a DCT-based integer matrix is applied to horizontal direction and a DST-based or KLT-based integer matrix is applied to vertical direction. Alternatively, the kind of transform matrix is determined based on the size of the transform unit.

The quantization unit 1030 determines a quantization parameter for quantizing the transformed block. The quantization parameter is a quantization step size. The quantization parameter is determined per a quantization unit. The quantization unit is a coding unit larger than or equal to a predetermined size. The predetermined size is called a minimum size of the quantization unit. The quantization unit having the minimum size is called a minimum quantization unit. If a size of the coding unit is equal to or larger than a minimum size of the quantization unit, the coding unit becomes the quantization unit. A plurality of coding units may be included in the minimum quantization unit. The minimum quantization unit may be an 8×8 block or a 16×16 block. The minimum size may be is determined per picture.

The quantization unit 1030 generates a quantization parameter predictor and generates a differential quantization parameter by subtracting the quantization parameter predictor from the quantization parameter. The differential quantization parameter is entropy-coded.

The quantization parameter predictor is generated as follows.

First Embodiment

The quantization parameters of a left coding unit, an above coding unit and an above-left coding unit are sequentially retrieved in this order. The quantization parameter predictor is generated using one or two available quantization parameters. For example, the first available quantization parameter is set as the quantization parameter predictor. Or an average of first two available quantization parameters is set as the quantization parameter predictor, and if only one quantization parameter is available, the available quantization parameter is set as the quantization parameter predictor.

Second Embodiment

There may be none of a left coding unit, an above coding unit and an above left coding unit of the current coding unit. On the other hand, there may be a previous coding unit of the current coding unit in coding order. Thus, the quantization parameters of neighboring coding units adjacent to the current coding unit and the previous coding unit may be used to generate the quantization parameter predictor. The quantization parameters are retrieved as the following order; 1) the quantization parameter of a left neighboring coding unit, 2) the quantization parameter of an above neighboring coding unit, 3) the quantization parameter of an above-left neighboring coding unit, and 4) the quantization parameter of the previous coding unit.

Alternatively, the quantization parameters are retrieved as the following order; 1) the quantization parameter of a left neighboring coding unit, 2) the quantization parameter of an above neighboring coding unit, and 3) the quantization parameter of the previous coding unit.

An average of first two available quantization parameters is set as the quantization parameter predictor when two or more quantization parameters are available, and when only one quantization parameter is available, the available quantization parameter is set as the quantization parameter predictor. For example, if the quantization parameters of the left and above coding units are available, an average of the left and above quantization parameters is set as the quantization parameter predictor. If only one of the quantization parameters of the left and above coding units is available, an average of the available quantization parameter and the quantization parameter of the previous coding unit is set as the quantization parameter predictor. If the quantization parameters of the left and above coding units are unavailable, the quantization parameter of the previous coding unit is set as the quantization parameter predictor. The average is rounded off.

The quantization unit 1030 quantizes the transformed block using a quantization matrix and the quantization parameter to generate a quantized block. The quantized block is provided to the inverse quantization unit 1080 and the scanning unit 1040.

The scanning unit 1040 scans the quantized coefficients and transforms the quantized coefficients into 1-dimensional quantized coefficient components applying a scan pattern to the quantized block.

In intra prediction mode, the distribution of the quantized coefficients varies according to the intra prediction mode and the size of the transform unit. Thus, the scan pattern is determined based on the intra prediction mode and the size of the transform unit. The scan pattern may be selected among a zigzag scan, vertical scan and horizontal scan. The zigzag scan may be replaced with a diagonal scan.

For example, if the size of the transform unit is equal to or smaller than 8×8, the horizontal scan is selected for the vertical mode and a predetermined number of neighboring intra prediction modes of the vertical mode, the vertical scan is selected for the horizontal mode and the predetermined number of neighboring intra prediction modes of the horizontal mode, and the zigzag scan or the diagonal scan is selected for the other intra prediction modes. When the size of the transform unit is larger than 8×8, the zigzag scan or the diagonal scan is selected for all intra prediction modes.

In inter prediction mode, a predetermined scan pattern is used. The predetermined scan pattern may be a zigzag scan or a diagonal scan.

When the size of the transform unit is larger than a predetermined size, the quantized coefficients are divided into a plurality of subsets and then scanned. The predetermined size may be 4×4. The scan pattern for scanning the subsets is the same as the scan pattern for scanning quantized coefficients within each subset. The quantized coefficients within each subset are scanned in the reverse direction. The subsets are also scanned in the reverse direction.

A parameter indicating a last non-zero position is encoded and transmitted to the decoder. The last non-zero position specifies position of last non-zero quantized coefficient within the transform unit. A parameter indicating a position of a last non-zero quantized coefficient within each subset is also transmitted to the decoding apparatus.

The inverse quantization unit 1080 inversely quantizes the quantized coefficients. The inverse transform unit 1090 inversely transforms the inverse-quantized coefficients to generate residual signals.

The addition unit 1130 adds the residual signals generated by the inverse transform unit 1090 and prediction signals generated by the intra prediction unit 1060 or the inter prediction unit 1070. The subtraction unit 1120 subtracts prediction samples from original samples to generate residual signals.

The post-processing unit 1100 performs deblocking filtering process, a sample adaptive offset process, and an adaptive loop filtering process.

The deblocking filtering process is performed to remove blocking artifacts which appears in the reconstructed picture.

The sample adaptive offset process is performed after performing the deblocking filtering process to reduce difference between an original sample and a reconstructed sample. It is determined per picture or slice whether the sample adaptive offset process is performed or not. The picture or the slice may be divided into a plurality of offset areas, and an offset type may be determined per each area. There are four edge offset types and two band offset types. If the offset type is one of the edge offset types, an edge type is determined per each sample within the offset area, and an offset corresponding to the edge type is added to the each sample. The edge type is determined by comparing the current sample with neighboring two samples.

The adaptive loop filtering process may be performed by comparing the reconstructed image and an original image to obtain filter coefficients. The filter coefficients are applied all samples within 4×4 block or 8×8 block. Whether the adaptive loop filtering is performed or not is determined per coding unit. Therefore, the size and coefficients of the loop filter may be changed on a coding unit basis.

The picture storing unit 1110 receives reconstructed pictures from the post-processing unit 1100 and stores them in a memory. The picture is a frame-based picture or a field-based picture.

The inter prediction unit 1070 performs motion estimation using one or more pictures stored in the picture storing unit 1110, and determines one or more reference picture indexes specifying one or more reference pictures and one or more motion vectors. The inter prediction unit 1070 generates a prediction block using the one or more reference picture indexes and the one or more motion vectors.

The intra prediction unit 1060 determines an intra prediction mode of a current prediction unit and generates a prediction block using the intra prediction mode.

The entropy coding unit 1050 entropy-codes the quantized coefficient components received from the scanning unit 1040, intra prediction information received from the intra prediction unit 1060, motion information received from the inter prediction unit 1070.

Figure 3:
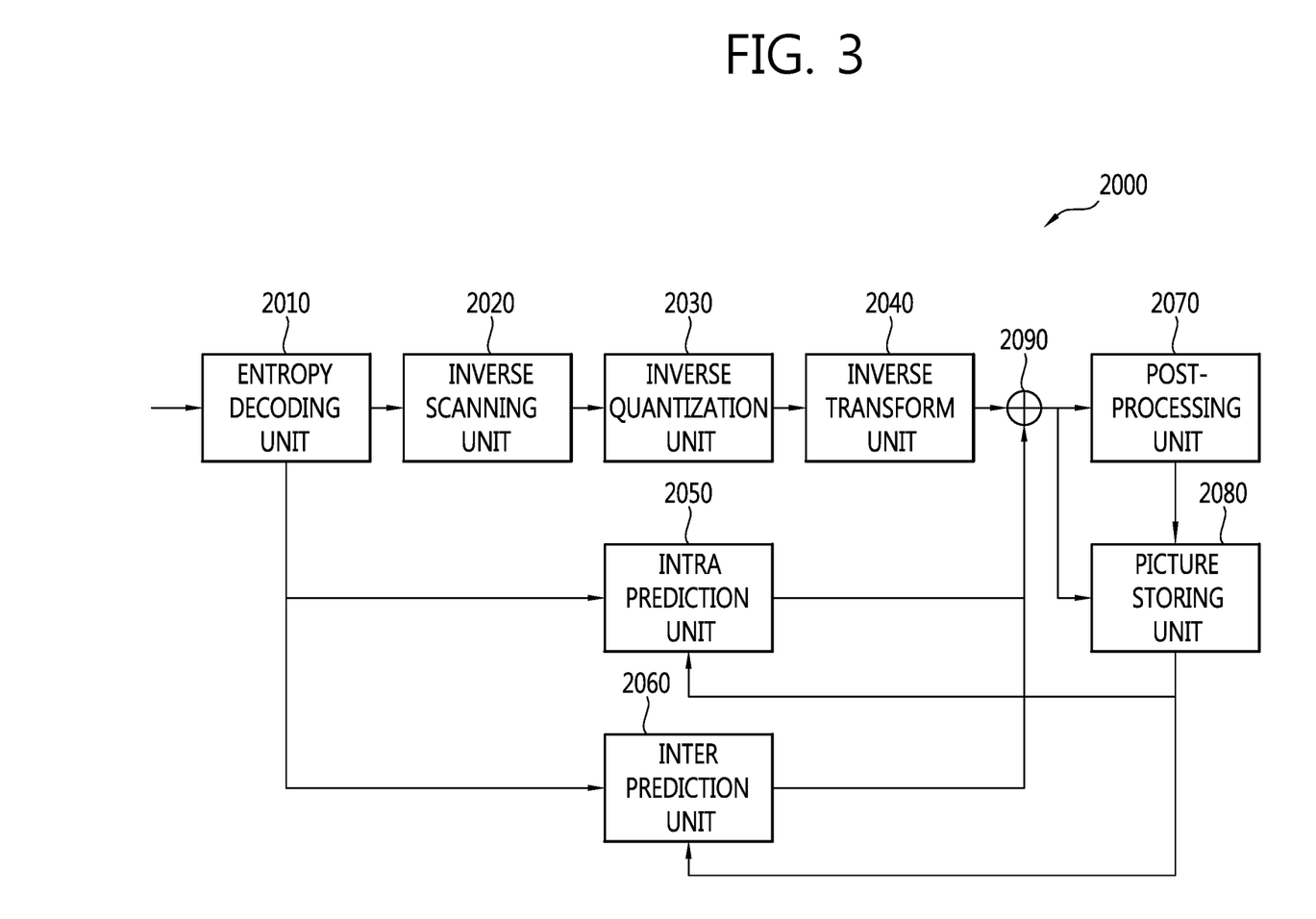
FIG. 3 is a block diagram illustrating a moving picture decoding apparatus according to the present invention.

FIG. 3 is a block diagram illustrating a moving picture decoding apparatus 2000 according to the present invention.

The moving picture decoding apparatus 2000 includes an entropy decoding unit 2010, an inverse scanning unit 2020, an inverse quantization unit 2030, an inverse transform unit 2040, an intra prediction unit 2050, an inter prediction unit 2060, a post-processing unit 2070, a picture storing unit 2080 and an addition unit 2090.

The entropy decoding unit 2010 extracts and entropy-decodes the intra prediction information, the inter prediction information and the quantized coefficient components from a received bit stream. The entropy decoding unit 2010 transmits the inter prediction information to the inter prediction unit 2060, transmits the intra prediction information to the intra prediction unit 2050, and transmits the quantized coefficient components to the inverse scanning unit 2020.

The inverse scanning unit 2020 transforms the quantized coefficient components into 2-dimensional quantized block using an inverse scan pattern.

In intra prediction mode, the inverse scan pattern is selected based on the intra prediction mode and the size of the transform unit. The inverse scan pattern may be selected among a zigzag scan, vertical scan and horizontal scan. The zigzag scan may be replaced with a diagonal scan.

For example, if the size of the transform unit is equal to or smaller than 8×8, the horizontal scan is selected for the vertical mode and a predetermined number of neighboring intra prediction modes of the vertical mode, the vertical scan is selected for the horizontal mode and the predetermined number of neighboring intra prediction modes of the horizontal mode, and the zigzag scan or the diagonal scan is selected for the other intra prediction modes. When the size of the transform unit is larger than 8×8, the zigzag scan or the diagonal scan is selected for all intra prediction modes.

In inter prediction mode, a predetermined scan pattern is used. The predetermined scan pattern may be a zigzag scan or a diagonal scan.

If the size of the current transform unit is larger than a predetermined size, the quantized coefficient components are inversely scanned in a subset basis to construct the quantized block. The subset has the predetermined size. The predetermined size may be 4×4. If the size of the transform unit is equal to the predetermined size, the quantized coefficient components of the transform unit are inversely scanned to construct the transform unit. When the quantized coefficient components are inversely scanned in a subset basis, the same inverse scanning pattern is applied to the quantized coefficient components of each subset.

The multiple subsets are inversely scanned in reverse direction. The quantized coefficient components are also inversely scanned in reverse direction. The inverse scan pattern applied to the quantized coefficient components to construct a subset is the same as the inverse scan pattern applied to the multiple constructed subsets. The inverse scanning unit 2020 performs inverse scanning using the parameter indicating a position of a last non-zero quantized coefficient of the transform unit.

The inverse quantization unit 2030 receives the differential quantization parameter from the entropy decoding unit 2010 and generates a quantization parameter predictor to obtain a quantization parameter of a current coding unit.

The quantization parameter predictor is generated as follows.

First Embodiment

The quantization parameters of a left coding unit, an above coding unit and an above-left coding unit are sequentially retrieved in this order. The quantization parameter predictor is generated using one or two available quantization parameters. For example, the first available quantization parameter is set as the quantization parameter predictor. Or an average of first two available quantization parameters is set as the quantization parameter predictor, and if only one quantization parameter is available, the available quantization parameter is set as the quantization parameter predictor.

Second Embodiment

There may be none of a left coding unit, an above coding unit and an above left coding unit of the current coding unit. On the other hand, there may be a previous coding unit of the current coding unit in coding order. Thus, the quantization parameters of neighboring coding units adjacent to the current coding unit and the previous coding unit may be used to generate the quantization parameter predictor. The quantization parameters are retrieved as the following order; 1) the quantization parameter of a left neighboring coding unit, 2) the quantization parameter of an above neighboring coding unit, 3) the quantization parameter of an above-left neighboring coding unit, and 4) the quantization parameter of the previous coding unit.

Alternatively, the quantization parameters are retrieved as the following order; 1) the quantization parameter of a left neighboring coding unit, 2) the quantization parameter of an above neighboring coding unit, and 3) the quantization parameter of the previous coding unit.

An average of first two available quantization parameters is set as the quantization parameter predictor when two or more quantization parameters are available, and when only one quantization parameter is available, the available quantization parameter is set as the quantization parameter predictor. For example, if the quantization parameters of the left and above coding units are available, an average of the left and above quantization parameters is set as the quantization parameter predictor. If only one of the quantization parameters of the left and above coding units is available, an average of the available quantization parameter and the quantization parameter of the previous coding unit is set as the quantization parameter predictor. If the quantization parameters of the left and above coding units are unavailable, the quantization parameter of the previous coding unit is set as the quantization parameter predictor. The average is rounded off.

The inverse quantization unit 2030 generates the quantization parameter of the current coding unit by adding the differential quantization parameter and the quantization parameter predictor. If the differential quantization parameter for the current coding unit is not transmitted from an encoding side, the differential quantization parameter is set to zero. The quantization parameter is generated per quantization unit.

The inverse quantization unit 2030 inversely quantizes the quantized block.

The inverse transform unit 2040 inversely transforms the inverse-quantized block to generate a residual block. The inverse transform matrix type is determined based on the prediction mode (intra prediction mode or inter prediction mode) and the size of the transform unit.

The addition unit 2090 generates reconstructed samples by adding the residual block and a prediction block.

The intra prediction unit 2050 recovers the intra prediction mode of the current prediction unit based on the intra prediction information received from the entropy decoding unit 2010, and generates a prediction block according to the intra prediction mode.

The inter prediction unit 2060 recovers one or more reference picture indexes and one or more motion vectors based on the inter prediction information received from the entropy decoding unit 2010, and generates a prediction block using the one or more reference pictures and the one or more motion vectors.

The operation of the post-processing unit 2070 is the same of the post-processing unit 1100 of FIG. 2.

The picture storing unit 2080 stores pictures which is post-processed by the post-processing unit 2070.

Figure 4:
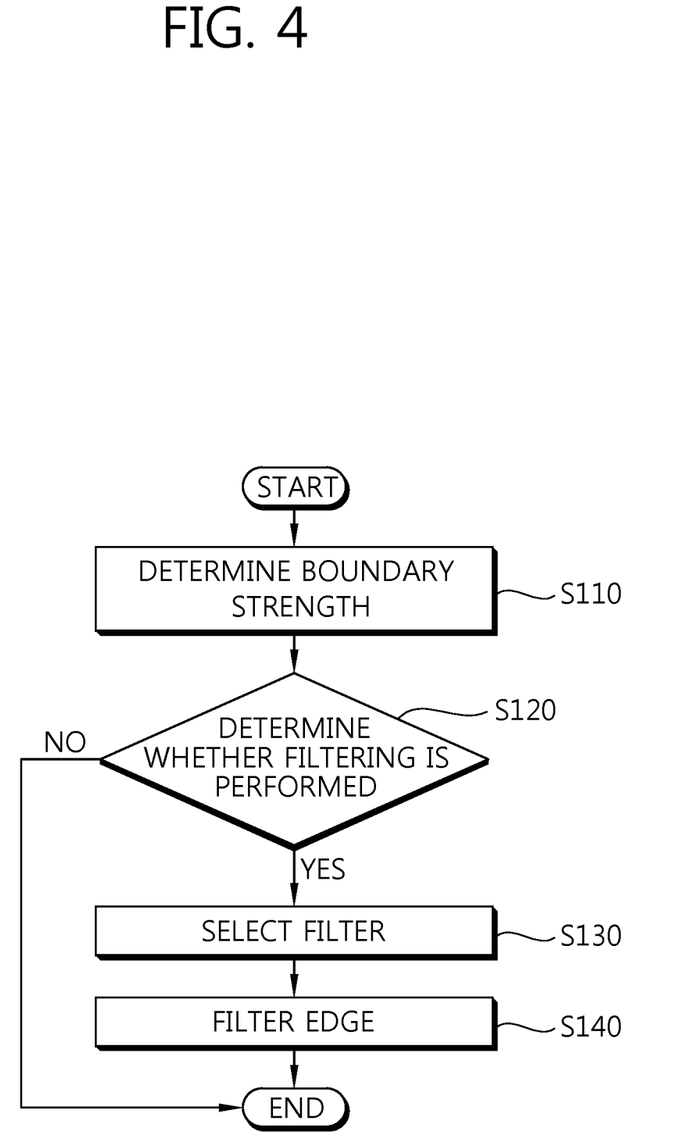
FIG. 4 is a flow chart illustrating a deblocking filtering process according to the present invention.

FIG. 4 is a flow chart illustrating a deblocking filtering process according to the present invention.

The deblocking filtering process is performed by the post-processing unit 1100 of the moving picture encoding apparatus 1000 shown in FIG. 2 and by the post-processing unit 2070 of the moving picture decoding apparatus 2000 shown in FIG. 3.

When it is determined that deblocking filtering is performed on a slice, the deblocking filtering process is applied to the slice. The moving picture decoding apparatus uses a flag 'diable_deblocking_filter_flag' received from a bit stream to determine whether the deblocking filtering is performed or not per slice.

The deblocking filtering is performed on each coding unit. The vertical edges are filtered first starting with the edge of the left-hand side of the coding unit toward the right-hand side of the coding unit. Then the horizontal edges are filtered starting with the edge on the top of the coding unit towards the bottom of the coding unit.

The deblocking filter is applied only to the prediction unit edges and the transform unit edges. If the width or height of the prediction unit or the transform unit is smaller than 8-sample length, the deblocking filter is applied only to the edges lying on 8×8 sample grid.

The boundary strength is determined on each 4-sample edge lying on 8×8 sample grid (S110).

Figure 5:
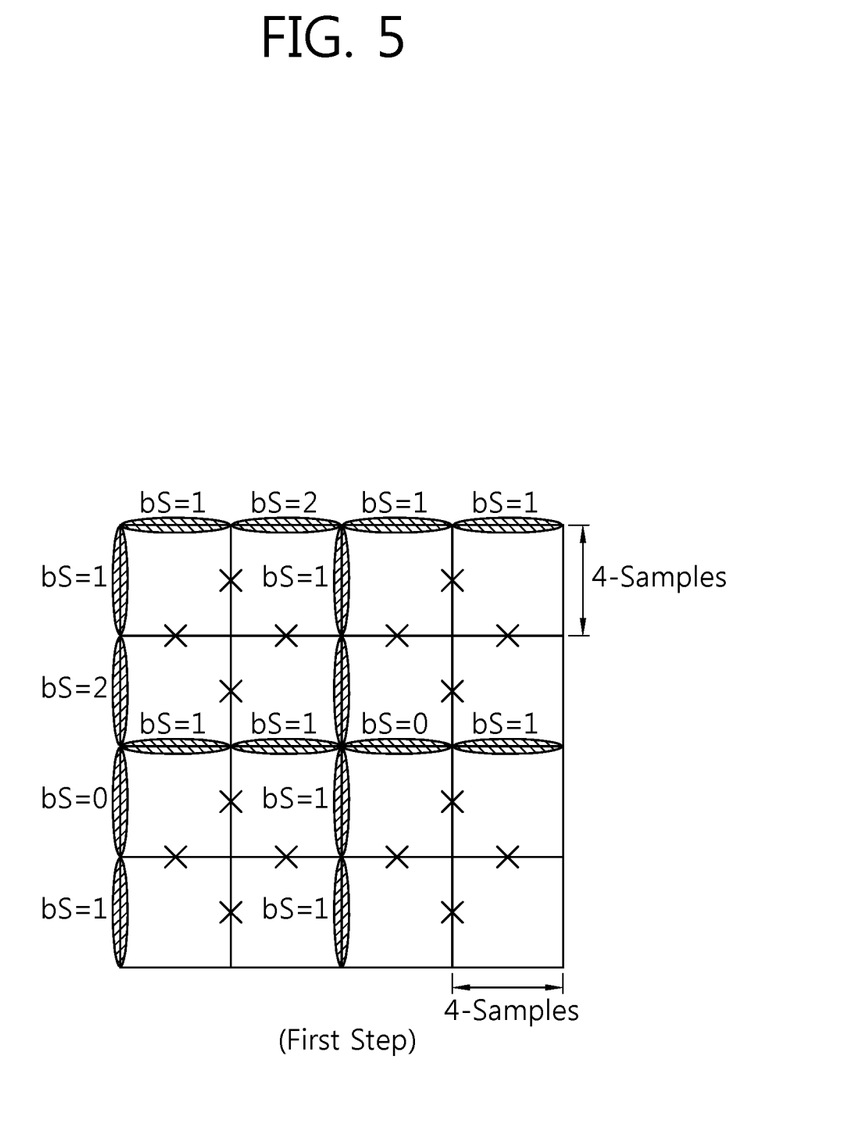
FIG. 5 is a conceptual diagram illustrating a method of determining the boundary strength according to the present invention.

FIG. 5 is a conceptual diagram illustrating a method of determining the boundary strength according to the present invention.

As shown in FIG. 5, the boundary strength of each edge within a coding unit is determined through one step. The boundary strength is determined only on the 4-sample edges lying on 8×8 sample grid. The present invention removes boundary strength on the edges of 4×4 block which is not a part of 8×8 sample grid. The present invention also removes the operation of generating boundary strength on 8-sample edges. Instead, according to the present invention, each 4-sample edge has its own boundary strength so as to align with deblocking decision on 4-sample edges.

Accordingly, the computational complexity required to determine the boundary strength according to the present invention is reduced by 50% or more when compared with the HEVC under development. Also, the present invention reduces the memory capacity and bandwidth required to determine the boundary strength by 50% or more. Therefore, the present invention reduces the complexity of hardware and software without deterioration of image quality.

Figure 6:
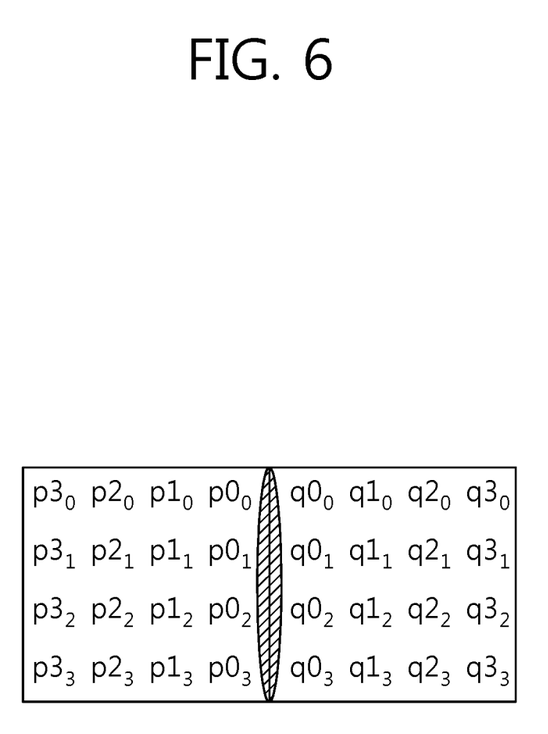
FIG. 6 is a conceptual diagram illustrating a 4-sample edge according to the present invention.

FIG. 6 is a conceptual diagram illustrating a 4-sample edge according to the present invention. As shown in FIG. 6, the 4-sample edge is located between a P block containing sample p0 and a Q block containing sample q0. The sample p0 corresponds to one of the samples $p0_0 \sim p0_3$, and the sample q0 corresponds one of the samples $q0_0 \sim q0_3$. The block P and Q is a prediction unit or a transform unit.

The boundary strength is determined as follows. The boundary strength is determined per 4-sample edge.

If the prediction unit containing the sample p0 or the prediction unit containing the sample q0 is intra-coded, the boundary strength of the 4-sample edge is set equal to 2. The 4-sample edge is a prediction unit edge. That is, if the block P and block Q are inter-coded, the boundary strength is set equal to 0 or 1.

If one or more following conditions are satisfied, the boundary strength is set equal to 1.

1) The 4-sample edge is a transform unit edge, the transform unit containing the sample p0 or the transform unit containing the sample q0 contains one or more non-zero transform coefficients.

2) The 4-sample edge is a prediction unit edge, the prediction unit containing the sample p0 and the prediction unit containing the sample q0 are inter-coded, and the prediction unit containing the sample p0 or the prediction unit containing the sample q0 have different reference pictures or a different number of motion vectors.

3) The prediction unit containing the sample p0 and the prediction unit containing the sample q0 are inter-coded, the prediction unit containing the sample p0 and the prediction unit containing the sample q0 have one motion vector, and the absolute difference between the horizontal or vertical component of the motion vectors is greater than or equal to a predetermined value (for example, 1 sample). The edge is not a part of a horizontal boundary of LCU.

4) The prediction unit containing the sample p0 and the prediction unit containing the sample q0 are inter-coded, the prediction unit containing the sample p0 and the prediction unit containing the sample q0 have two motion vectors, the prediction unit containing the sample p0 and the prediction unit containing the sample q0 have at least one same reference picture, and the absolute difference between the horizontal or vertical component of two motion vectors corresponding to the same reference picture is greater than or equal to the predetermined value. The edge is not a part of a horizontal boundary of LCU.

As described above, if the 4-sample edge is not lying on the 8×8 sample grid, the boundary strength is set equal to 0.

On the other hand, when the edge is a horizontal edge of LCU and a prediction unit containing the sample p0 is located above the horizontal edge of LCU, the motion information of the prediction unit containing the sample p0 may be replaced with the motion information of a left or right neighboring prediction unit of the prediction unit containing the sample p0 based on the size and/or location of the prediction unit containing the sample p0.

Figure 7:
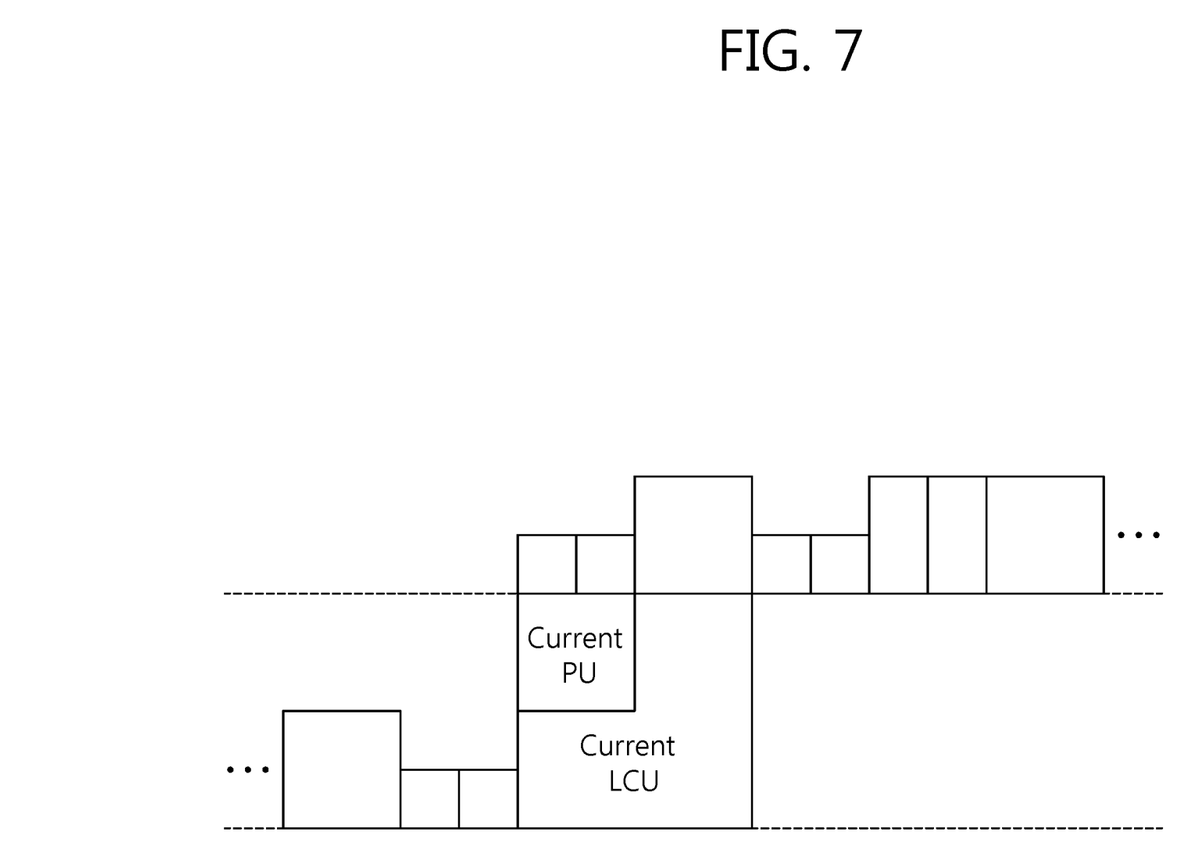
FIG. 7 is a conceptual diagram illustrating an exemplary disposition of prediction units according to the present invention.

FIG. 7 is a conceptual diagram illustrating an exemplary disposition of prediction units according to the present invention.

Deblocking filtering is applied to edges of 8×8 sample grid. Therefore, the encoding apparatus and the decoding apparatus should store the motion information of upper prediction units and above-right prediction units of a current LCU. Width of each prediction unit as well as the motion information of each prediction unit is to be stored to recover the motion information correctly. To reduce the quantity of information to be stored, it is desirable to store motion information at every fixed width to remove the width information to be stored. According to the present invention, the fixed width is set to a multiple of the minimum allowable width (for example, 2 times of the minimum allowable width) to reduce the capacity of the line buffer. The fixed width may be set to 8-sample length.

Figure 8:
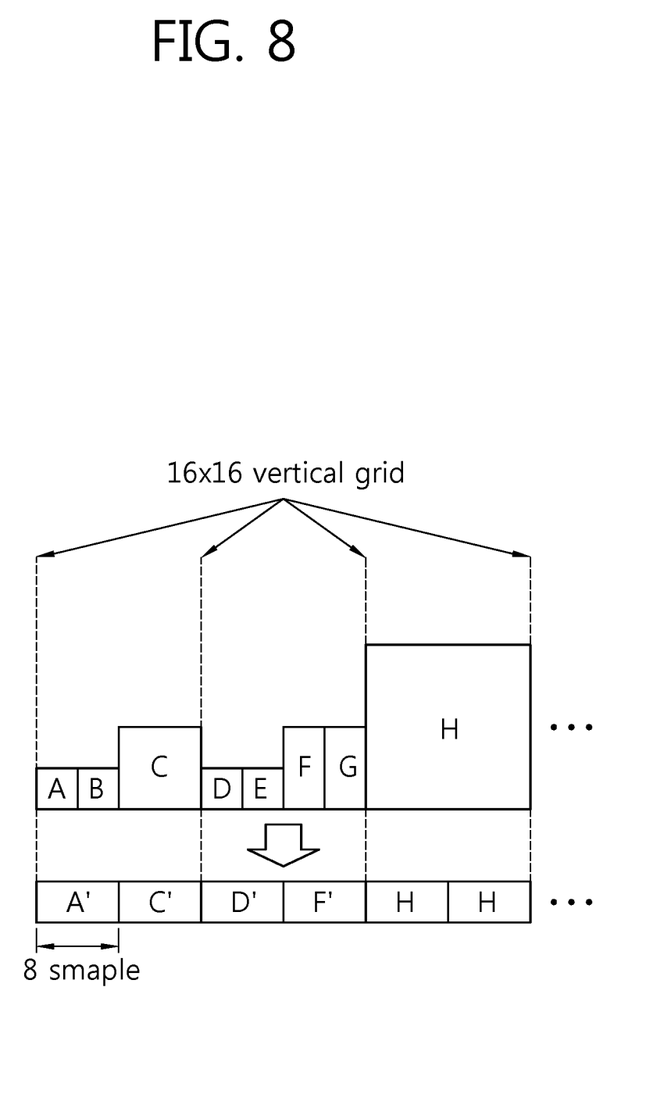
FIG. 8 is an exemplary diagram illustrating motion information to be stored in a line buffer according to the present invention.

FIG. 8 is an exemplary diagram illustrating motion information to be stored in a line buffer according to the present invention.

The upper part of the FIG. 8 illustrates the sizes and the motion information of above prediction units and above-right prediction units of the current LCU. The lower part of the FIG. 8 illustrates motion information to be stored into the line buffer.

As shown in FIG. 8, if the width of a prediction unit is 8-sample length, the motion information C is stored as it is. If the width of a prediction unit is larger than 8, same motion information H is stored per every fixed width of 8-sample length.

But, if the width of a prediction unit is 4-sample length, the motion information to be stored may be replaced based on the location of the prediction unit. For example, motion information A' is stored for the prediction unit having motion information A and the prediction unit having motion information B. Motion information D' is stored for the prediction unit having motion information D and the prediction unit having motion information E, and motion information F' is stored for the prediction unit having motion information F and the prediction unit having motion information G.

The motion information A', D' and F' may be set as the motion information of left prediction unit of two prediction units.

Alternatively, the motion information A', D' and F' may be set as motion information of the prediction unit bordering the vertical line of 16×16 sample grid of the two prediction units. That is, the motion information A' may be set as the motion information A, the motion information D' may be set as the motion information D, and the motion information F' may be set as the motion information G.

Next, it is determined whether deblocking filtering is performed or not on the 4-sample edge (S120).

Figure 9:
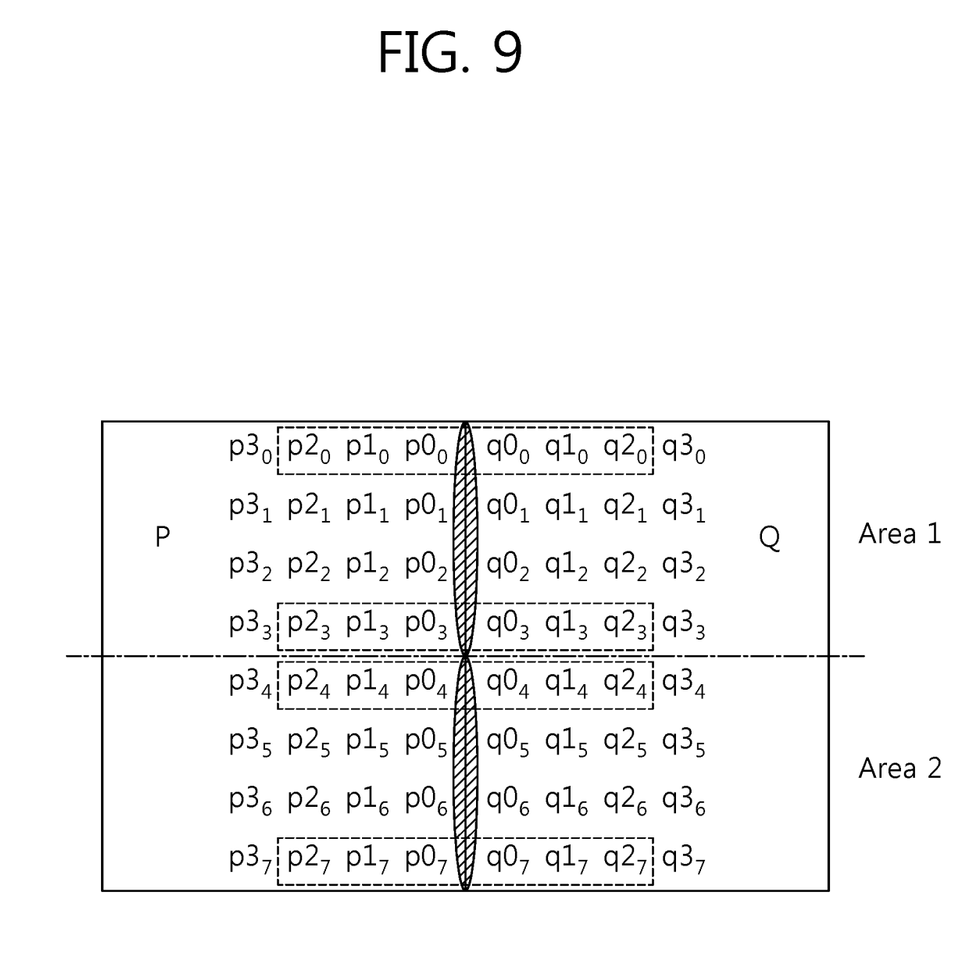
FIG. 9 is a conceptual diagram illustrating positions of samples used for determining whether a block edge is filtered or not according to the present invention.

FIG. 9 is a conceptual diagram illustrating positions of samples used for determining whether a block edge is filtered or not according to the present invention. As shown in FIG. 5, the determination is performed on each 4-sample edge of the 8×8 block edge.

For each edge, deblocking filtering is performed if the following two conditions are satisfied.

1) bS>0
2) d<β

The bS represents a boundary strength. The value of the variable β is determined based on a boundary quantization parameter $QP_B$.

The variable d is defined as follows.

In the first embodiment, $d=d_{p0}+d_{q0}+d_{p3}+d_{q3}$ for area 1, $d=d_{p4}+d_{q4}+d_{p7}+d_{q7}$ for area 2, $d_{pk}=|p2_k-2\cdot p1_k+p0_k|$ and $d_{qk}=|q2_k-2\cdot q0_k|$.

In the second embodiment, $d=d_{p0}+d_{q0}+d_{p2}+d_{q2}$ for area 1, $d=d_{p4}+d_{q4}+d_{p6}+d_{q6}$ for area 2.

In the third embodiment, $d=d_{p1}+d_{q1}+d_{p2}+d_{q2}$ for area 1, d $d_{p5}+d_{q5}+d_{p6}+d_{q6}$ for area 2.

Next, if it is determined that deblocking filtering is applied to the 4-sample edge, one deblocking filter is selected among a strong filter and a weak filter. But, if it is determined that deblocking filtering is not applied to the 4-sample edge, the deblocking filtering process ends for that edge. As shown in FIG. 9, a filter is selected for each 4-sample edge.

If the following conditions are satisfied, the strong filter is selected for area 1.

1) $d<(β>>2)$
2) $|p3_i-p0_i+q3_i-q0_i|<β>>3)$ for each i, i=0, 3
3) $|p0_i-q0_i|<(5*t_c+1)>>1$ for each i, i=0, 3

Or

1) $d_i<(β>>1)$ for each i, i=0, 3
2) $|p3_i-p0_i|+|q3_i-q0_i|<(β>>3)$ for each i, i=0, 3
3) $|p0_i-q0_i|<(5*t_c+1)>>1$ for each i, i=0, 3

Otherwise, the weak filter is selected. The value of the variable $t_c$ is determined based on the boundary quantization parameter $QP_B$.

If the following conditions are satisfied, the strong filter is selected for area 2.

1) $d<(β>>2)$
2) $|p3_i-p0_i|+|q3_i-q0_i|<(β>>3)$ for each i, i=4, 7
3) $|p0_i-q0_i|<(5*t_c+1)>>1$ for each i, i=4, 7

Or

1) $d_i<(β>>1)$ for each i, i=4, 7
2) $|p3_i-p0_i|+|q3_i-q0_i|<(β>>3)$ for each i, i=4, 7
3) $|p0_i-q0_i|<(5*t_c+1)>>1$ for each i, i=4, 7

Otherwise, the weak filter is selected.

In another embodiment, i=0, 3 is replaced with i=0, 2 for area 1, and i=4, 7 is replaced with i=5, 7 for area 2.

In another embodiment, i=0, 3 is replaced with i=1, 2 for area 1, and i=4, 7 is replaced with i=5, 6 for area 2.

Next, if the deblocking filter is selected, the edge is filtered using the deblocking filter (S140).

The strong filter is as follows.

$p_0'=(p_2+2*p_1+2*p_0+2*q_0+q_1+4)>>3)$
$p_1'+(p_2+p_1+p_0+q_0+2)>>2$
$p_2'=(2*p_3+3*p_2+p_1+p_0+q_0+4)>>3$
$q_0'=(p_1+2*p_0+2*q_0+2*q_1+q_2+4)>>3$
$q_1'=(p_0+q_0+q_1+q_2+2)>>2$
$q_2'=(p_0+q_0+q_1+3*q_2+2*q_3+4)>>3$

The weak filter is as follows.

$\Delta=Clip3(-t_C,t_C,\Delta)$
$p_0'=Clip1(p_0+\Delta)$
$q_0'=Clip1(q_0-\Delta)$
$\Delta p=Clip3(-(t_C>>1), t_C>>1, (((p_2+p_0+1)>>1)-p_1+\Delta)>>1)$
$p_1'=Clip1(p_1+\Delta p)$
$\Delta q=Clip3(-(t_C<<1), t_C>>1, (((q_2+q_0+1)>>1)-q_1-\Delta)>>1)$
$q_1'=Clip1(q_1+\Delta q)$ The variables β and $t_c$ are determined by the boundary quantization parameter $QP_B$, and increases monotonically as the boundary quantization parameter $QP_B$ increases. The relation between the parameters β and $t_c$, and the quantization parameter is defined as a table.

The boundary quantization parameter $QP_B$ is an average of the quantization parameter $QP_P$ of P block containing sample p0 and $QP_Q$ of Q block containing sample q0. The average is a value rounded off. If at least one of P block and Q block is intra-coded, the parameter $t_c$ increases by 0, 1 or 2 as the $QP_B$ increases by 1.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A method of processing a reconstructed picture, the method comprising:
   generating a prediction block based on a prediction mode;
   generating a quantization block by inverse-scanning quantization coefficient information;
   generating a transform block by inverse-quantizing the quantization block using a quantization parameter;
   generating a residual block by inverse-transforming the transform block;
   generating a reconstructed picture by using the prediction block and the residual block; and
   applying a deblocking filter on the reconstructed picture,
   wherein it is determined whether the deblocking filtering is applied between two adjacent blocks P and Q containing samples p0 and q0 respectively by using a boundary quantization parameter when a boundary strength is not zero,
   wherein the boundary quantization parameter is set to an average value of a quantization parameter of block P and a quantization parameter of block Q, and the quantization parameter is derived by adding a residual quantization parameter and a quantization parameter predictor, wherein the quantization parameter predictor is derived per quantization unit which includes at least one coding unit, when at least two of a left quantization parameter, an above quantization parameter and a previous quantization parameter are available, an average of two available quantization parameters selected in order of the left quantization parameter, the above quantization parameter and the previous quantization parameter is set as the quantization parameter predictor, wherein the previous quantization parameter is set as the quantization parameter predictor when both of the left quantization parameter and the above quantization parameter are unavailable, wherein the transform block is inversely transformed by using transform matrix determined according to a size of a transform unit.

2. The method of claim 1, wherein a deblocking filter to be applied is selected by using the boundary quantization parameter.

3. The method of claim 1, wherein the average of the two available quantization parameters is rounded off.

* * * * *